United States Patent [19]
Morelli

[11] 3,828,876
[45] Aug. 13, 1974

[54] MOTOR VEHICLE HAVING WHEELS IN A DIAMOND PATTERN

[76] Inventor: Alberto Morelli, Strada Va Salice 72, Turin, Italy

[22] Filed: Oct. 5, 1972

[21] Appl. No.: 295,327

[30] Foreign Application Priority Data
Oct. 8, 1971 Italy.................................. 70311/71

[52] U.S. Cl................. 180/21, 180/89 R, 280/282, 180/82 R
[51] Int. Cl........................................... B62d 61/04
[58] Field of Search ....... 180/21, 89, 64 R; 280/282

[56] References Cited
UNITED STATES PATENTS

| | | | |
|---|---|---|---|
| 1,348,568 | 8/1920 | Kemble | 180/21 |
| 1,426,975 | 8/1922 | Fuscaldo | 180/21 |
| 2,533,752 | 12/1950 | Alamagny | 180/21 |

FOREIGN PATENTS OR APPLICATIONS

| | | | |
|---|---|---|---|
| 889,593 | 2/1962 | Great Britain | 180/21 |

OTHER PUBLICATIONS

Automotive Industries, 10/20/34, pp. 472 (Disclosing Voisin's car design).

Primary Examiner—David Schonberg
Assistant Examiner—John P. Silverstrim
Attorney, Agent, or Firm—Sughrue, Rothwell, Mion, Zinn & Macpeak

[57] ABSTRACT

This invention relates to a motor vehicle with a rhomboidal or diamond configuration of road wheels, with a front steerable wheel, two driven side wheels and a free-wheeling rear wheel with a non-steering axis. For good stability the ratio of the distance from the centre of gravity of the vehicle of the rear and side wheels is between 1.5 and 3, and the ratio between the interaxis distance of the front and side wheels and the distance between said centre of gravity and the front wheel is between 1.225 and 1.66.

4 Claims, 4 Drawing Figures

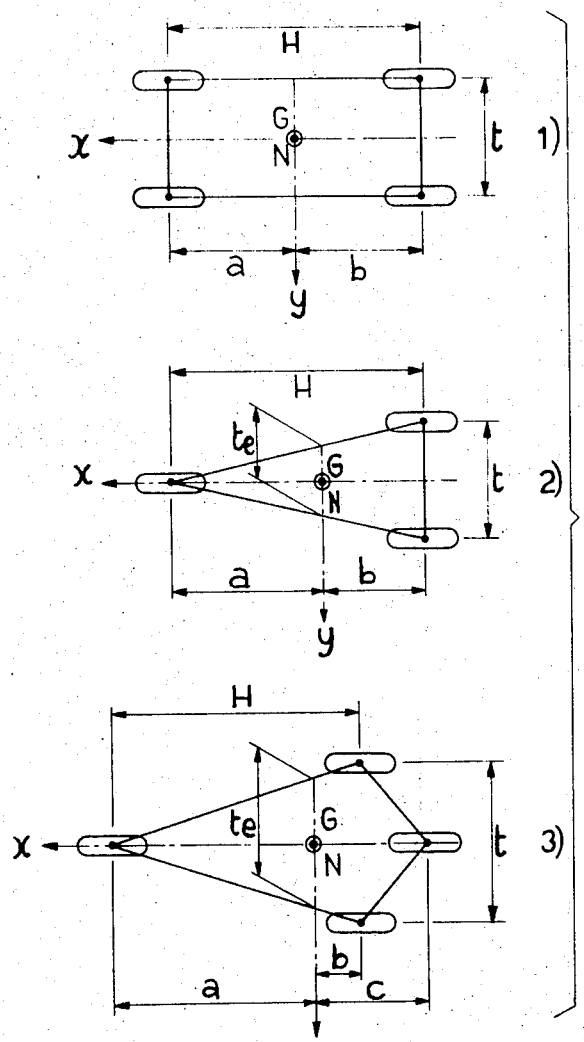
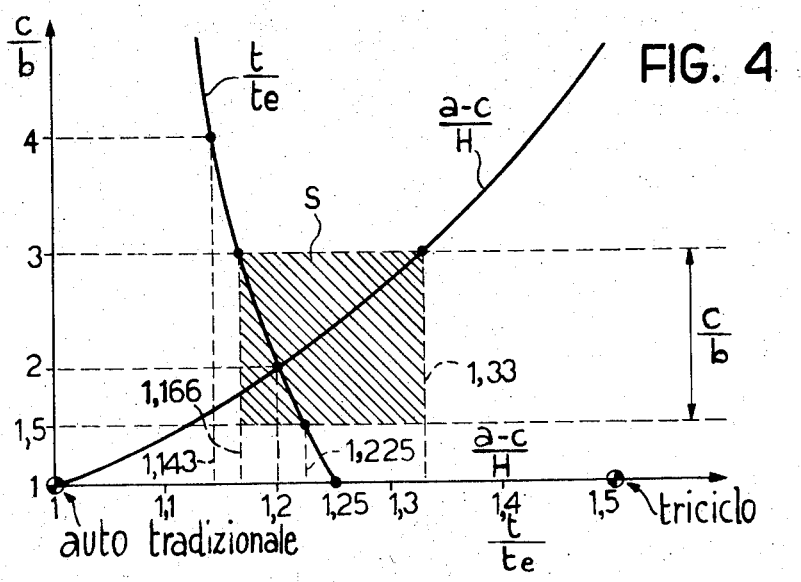
FIG. 1
FIG. 4

MOTOR VEHICLE HAVING WHEELS IN A DIAMOND PATTERN

This invention relates to an improved motor vehicle with a diamond or rhomboidal disposition of its road wheels.

BACKGROUND AND OBJECTS OF THE INVENTION

Vehicles are known which have stable balance and which have three or four road wheels at least one of which is driven. According to how the road wheels are disposed, such vehicles are subdivided into the following categories, illustrated diagrammatically in plan in FIG. 1 of the accompanying drawings:

1. Conventional, characterised by four wheels disposed at the vertices of a quadrilateral;
2. Tricycles, characterised by three wheels disposed at the vertices of a triangle;
3. Rhomboidal, characterised by four wheels disposed at the vertices of a rhomboid, more particularly two at opposite sides of the vehicle, one at the front and one at the rear of the vehicle.

In all the vehicles referred to above, the centre of gravity G has a vertical projection onto the ground which lies within the area defined by the points of contact of the wheels with the ground. The vertical projection through the centre of gravity G passes through a neutral point N at which the resultant of the lateral forces acting upon the vehicle during drift movement acts. In order that the vehicle shall be directionally stable, it is necessary, as is known, that the distance between the centre of gravity G and the neutral point N shall be close to zero: in particular the vehicle is said to be "neutral" if the distance GN is 0.

In FIG. 1, $a$ and $b$ are the distances between the centre of gravity G and, respectively, the axle of the front wheel(s) and the axle of the rear wheels (or lateral wheels in the case of a rhomboid configuration). It will be assumed that the resistance to lateral drift is equal for all the wheels, when the magnitude of the distance GN will be, in the three configurations referred to above, as follows:

1. Conventional car: $GN = (2a + 2b)/4 = (a + b)/2$
2. Tricycle: $GN = a + 2b/3$
3. Rhomboidal car: $GN = a + 2b + c/4$ In the rhomboidal configuration (3), $c$ represents the distance of the rear wheel from the centre of gravity G.

The condition $GN = 0$ can be fulfilled for configurations 1 and 2 if we put:

i. $a = b$ for configuration (1);
ii. $a = -2b/3$ for configuration (2), and
iii. $a + 2b + c = 0$ for configuration (3).

The solution of equation (iii) is possible by appropriate selection of one of the variables $a$, $b$, or $c$.

This invention is based upon the conception of the conditions stated above, and an object of the invention is to provide an automobile of the type with rhomboidal configuration of the road wheels in which the condition of directional stability as expressed by the foregoing equation (iii) are established compatible with passenger comfort.

Referring to FIG. 1, the wheel span is indicated by $t$, and the wheelbase by H: in the case of the rhomboidal configuration (3) the distance H is the distance between the front wheel axle and the axle of the lateral wheels. In fact it is necessary that, when travelling around a curve of a given radius, the lateral drift of the wheels shall be compatible with the frictional grip of the tyres, with the object of avoiding lateral skidding of the wheels.

The invention also has the object of providing a vehicle with a rhomboidal disposition of the ground wheels in which the condition of directional stability expressed by the aforesaid equation (iii) shall be established, compatible with a rational disposition of the motor-propulsion system of the vehicle.

Among other important objects of the invention is the provision of a vehicle with rhomboidal disposition of the road wheels in which directional stability is ensured even when, during braking, the braking wheels reach the limit of frictional hold, and in which there shall be reduced, and virtually nullified, the disturbing effects of the lateral forces and yawing moments due to skidding of the driven wheels through excessive drive applied thereto in relation to the frictional grip of said wheels.

A further object of the invention is the provision of a vehicle with rhomboidal disposition of the ground wheels in which the condition of directional stability expressed by the aforesaid equation (iii) is established, compatible with a geometrical disposition which shall allow the adoption of a safe, aerodynamic vehicle body having a reduced coefficient of aerodynamic drag.

SUMMARY OF THE INVENTION

In order to achieve these and other objects which appear from the detailed description which follows, this invention has as its object a motor vehicle having four road wheels arranged in a rhomboidal disposition, with a front wheel, two side wheels and a rear wheel, wherein said two side wheels are driven, the front wheel being steerable, and said three wheels having brakes, and the rear wheel being maintained with its axis parallel to that of the driven wheels, and wherein the ratio between the distances from the centre of gravity of the vehicle of the rear wheel and of the driven wheels respectively is comprised between 1.5 and 3, whilst the ratio between the interaxis spacing of the front and driven wheels and the distance of the front wheel from the centre of gravity is comprised between 1.225 and 1.66.

Making use of the aforesaid ratio values $c/b$ one then has, in accordance with the previously declared objects, adequate directional stability and at the same time overall dimensions in the longitudinal and transverse direction which are reduced sufficiently relative to those of a car with the conventional quadilateral disposition of the road wheels (about 20 percent for $c/b = 2$) whilst the axis of the rear wheel is at such distance from the axis of the two driven wheels as to allow a reasonable disposition of the motor-propulsion system of the vehicle.

Moreover, in the rhomboidal disposition of the road wheels according to the invention, in which the motor-driven wheels are placed at the sides of the car, when these driven wheels exceed the limit of frictional hold by reason of excessive driving force then there remain, to counteract the disturbing effects due to lateral forces and yawing moments, two wheels having two separate axles, namely the front and the rear wheels. This is in contrast to vehicles with traditional wheel configurations, in which, when the driven wheels lose their frictional grip, then against these disturbing movements, only one axle reacts, which is a considerable disadvantage. In fact, it is well known that in the case of conventional rear-wheel drive vehicles, when the driven wheels exceed the limit of frictional hold, the neutral point N moves to the vicinity of the front axle and the vehicle becomes heavily over-steered, with consequent directional instability, even at low speed.

Similarly, in the case of conventional vehicles with front wheel drive, the neutral point N moves to the vicinity of the rear axle when the driven wheels lose their frictional grip on the road, the vehicle becoming strongly under-steered, and hence no longer under control, the driven wheels being in this case also the steerable wheels.

In a preferred embodiment of the invention the distribution of the load on the wheels is so chosen that, under static conditions, about 10 percent of the load bears upon the rear wheel, about 25 percent upon the front, steerable wheel, and the remainder of the load bears equally upon the two driving wheels. Moreover, since during braking the load upon the rear wheel further diminishes, this wheel may advantageously be devoid of brakes, its contribution to the total braking force being negligible. In this way one further improves, in accordance with the declared objects, directional stability during the braking. In fact, even if the three braked wheels, that is, the front and the two lateral wheels, reach the limit of frictional grip, then the rear wheel maintains useful frictional grip to provide a lateral stabilising action, which, among other things, avoids the so-called "head-tail" which occurs in braking.

Moreover, the rear wheel, being without brakes and not subject to a driving force, it has a speed of rotation which is exactly proportional to the speed of travel of the vehicle.

In preferred embodiments of the invention, the speed of rotation of the rear wheel is taken as a reference for controlling the braking of the other wheels so that the difference in angular speed between the rear wheel and the other wheels during braking shall not exceed the value corresponding to the maximum frictional grip, a feature which renders the vehicle particularly suitable for application to automatic ("anti-skid") brake control systems.

BRIEF DESCRIPTION OF THE DRAWINGS

Further characteristics and advantages will be apparent in the course of the detailed Specification which follows, by way of non-limiting example, with reference to the attached drawings, wherein:

FIG. 1 shows diagrammatically in plan the three types of motor vehicle referred to previously;

FIG. 4 is a diagram illustrating the ratios of transverse and longitudinal dimensions of the vehicle, according to the invention compared with a four-wheeled vehicle of conventional disposition, and a vehicle with a tricycle configuration.

DETAILED DESCRIPTION WITH REFERENCE TO THE DRAWINGS

Figure 2:
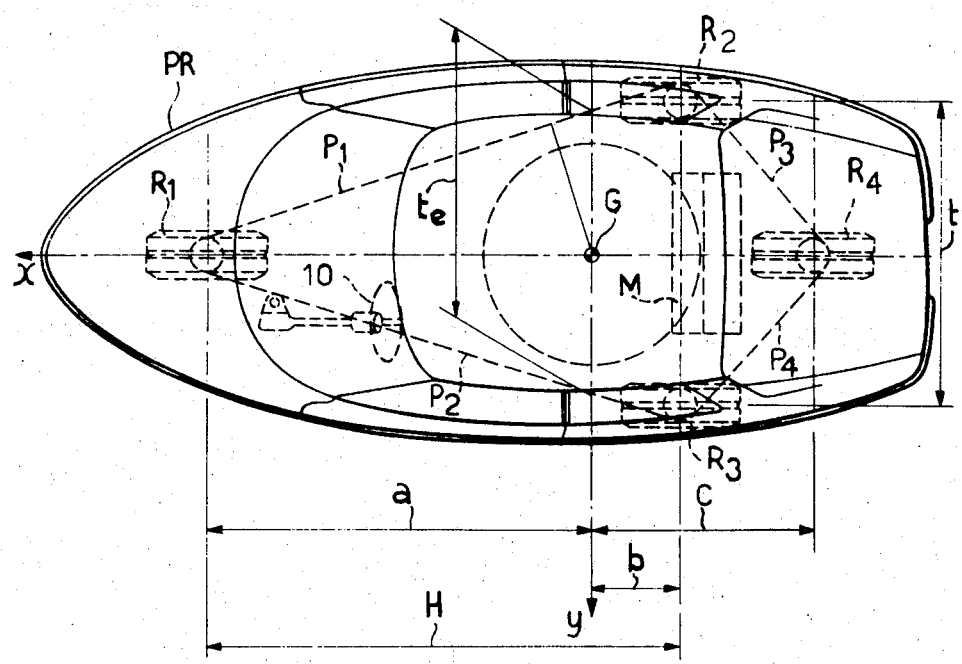
FIG. 2 is a plan view from above showing diagrammatically a vehicle according to the invention.

Referring to FIG. 2, the motor vehicle according to the invention has four road wheels placed at the vertices of a rhomboid, more precisely, a single front, steerer, wheel $R_1$ steerable by a steering wheel 10, two engine-driven lateral wheels $R_2$, $R_3$, and a single rear wheel $R_4$. The rear wheel is freely rotatable about a fixed axis parallel to the common axis of the two driven wheels $R_2$, $R_3$.

Figure 3:
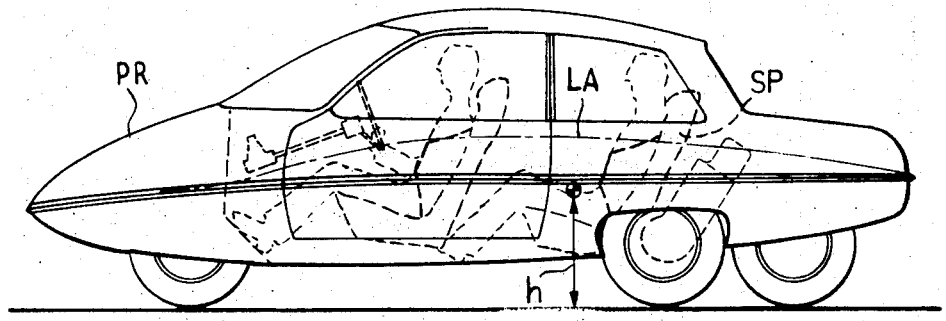
FIG. 3 is a lateral elevation of the vehicle shown in FIG. 2.

In conformity with the notations already used in the geometrical diagrams of FIG. 1, the centre of gravity G of the vehicle has a vertical projection on to the ground which lies within the area defined by the points of contact of the four wheels. Similarly, in FIG. 2 the letters $a$, $b$, and $c$ indicate the distances from the centre of gravity G of the front wheel $R_1$, of the two driven wheels $R_2$, $R_3$ and of the rear wheel $R_4$ respectively. The position of the centre of gravity G in relation to the four wheels and to the ground is defined by the distances $a$, $b$ and $c$ and also by the height $h$ of the centre of gravity G above the ground (FIG. 3). In FIG. 2, H indicates the distance between the axes of the front wheel $R_1$ and the driven wheels $R_2$, $R_3$, $t$ the lateral distance between the two driven wheels $R_2$ and $R_3$ and $t_e$ the lateral width of the rhomboidal polygon $P_1$, $P_2$, $P_3$, $P_4$ intersected by the lateral chord passing through the centre of gravity G.

All the dimensions referred to above are given with reference to a Cartesian system of axes $x - y$ having, as illustrated in FIGS. 1 and 2, its origin coinciding with the centre of gravity G, its abscissae $x$ extending longitudinally towards the front, and its ordinates $y$ laterally towards the driver's side of the vehicle.

In the motor vehicle according to the invention the ratio $c/b$ between the distances of the rear wheel $R_4$ and, respectively, of the two driven wheels $R_2$, $R_3$ from the centre of gravity G is chosen so that it is between 1.5 and 3.0, and is preferably equal to 2. This value of the ratio is, in fact, the most compatible with the longitudinal and transverse dimensions of a car with rhomboidal road wheel disposition as compared with a car of conventional disposition, and also ensures a rational disposition of the engine and propulsion system.

In fact, since with the assumed rotation of Cartesian coordinates, $a - b = H$, the condition (iii) for directional stability:

$$a + 2b = c = 0$$

becomes:

$$3b + c = -H,$$

which can be expressed nondimensionally as:

$$3 + c/b = -H/b$$

(I)

In addition, with reference to the rotations of FIG. 2, one also has, as a condition for the avoidance of shaking:

$$t_e/t + a/H = (H + b)/H = 1 + (b/H)$$

(II)

where $t$, the wheelspan of the driving wheels $R_2$ and $R_3$, determines the transverse dimensions of the vehicle, and $t_e$ is proportional to the height $h$ of the barycentre G from the ground.

Combining these two equations (I) and (II) set out above, one obtains the further equation:

$$2 + c/b = t_e/t \quad \text{(III)}$$

FIG. 4 shows how the ratio $t/t_e$ (abscissa) varies with the ratio $c/b$ (ordinate). The curve tends asymptotically towards 1. It can be seen that the wheelspan $t$ of the motor vehicle with rhomboidal wheel disposition is always greater than that of a four-wheeled motor vehicle with a conventional wheel disposition, unless $c/b$ is infinite, a condition obtained by making $b = 0$ and hence $a = -c$.

The condition $a = -c$, however, involves excessive longitudinal dimensions, $H$ being equal to $a$, and moreover it involves further disadvantages inherent in the steering of the vehicle. On the other hand, since the overall length of the wheelbase is proportional to $(a - c)$, it is possible to make the following nondimensional equation:

$$(a - c)/H = 2b/H (1 + (c/b)) \quad \text{(IV)}$$

which, taking into account the earlier equation (I) makes it possible to plot the ratio $(a - c)/H$ against $c/b$, this curve being labelled $(a - c)/H$ in FIG. 4. The curves $t/t_e$ and $a - c/H$ therefore give the ratios of transverse and longitudinal dimensions of the rhomboidal motor vehicle according to the invention compared with a conventional four wheeled motor vehicle.

From FIG. 4 is it seen that the optimum condition is obtained when $c/b = 2$, at which value the dimensional increments in both directions are around 20 percent.

It has however been established that the value of the ratio $c/b$ may advantageously be between 1.5 and 3, that is within the area S marked with cross-hatching. The upper limit of the field of variability of the ratio $c/b$ is determined by the drift of the rear wheel $R_4$ compatible with the limiting value of the coefficient of frictional grip of the tyre, the limit of frictional grip being capable of being reached only under conditions of maximum steering when manoeuvring at very low speed. On the contrary, the lower limit of the ratio $c/b$ is fixed in relation to the minimum distance of the rear wheel $R_4$ from the axis of the driven wheels $R_2$, $R_3$ compatible with the arrangement of the engine and propulsion system which acts upon the lateral wheels $R_2$, $R_3$.

According to the invention, by keeping the value $c/b$ within prescribed limits, the position of the rear wheel $R_4$ in relation to the driven wheels $R_2$, $R_3$ is such as to allow a disposition of the engine M as illustrated in broken outline in FIG. 2. It will be seen that the engine M is arranged transversely in relation to the direction of travel of the vehicle, which ensures, amongst other things, a rational distribution of the load upon the wheels. This is particularly advantageous if the load distribution is such that, under static conditions, about 25 percent of the load bears upon the front, steerer, wheel $R_1$, about 10 percent of the load bears upon the rear wheel $R_4$ and the remainder of the load bears upon each of the lateral wheels $R_2$ and $R_3$. Since during braking the load on the rear wheel $R_4$ diminishes further, the rear wheel $R_4$ is not provided with a brake, fulfilling, instead, a purely directional and stabilising function of very great importance. In fact, when the three braked wheels $R_1$, $R_2$ and $R_3$ reach the limit of frictional hold, then the rear wheel $R_4$, being unbraked, retains its hold, thus ensuring an efficient lateral stabilising action. Moreover, the presence of the rear wheel $R_4$ without a brake considerably improves the stability of the motor vehicle when the two driven wheels $R_2$ and $R_3$ reach and exceed the limit of frictional hold and spin as a result of excessive torque applied thereto by the engine. In this case the wheels $R_1$ and $R_4$ efficiently counteract the lateral forces tending to produce yawing movements, thus substantially preventing the neutral point N from shifting excessively in relation to the centre of gravity G.

More particularly, if one assumes the preferred ratio $c/b = 2$, then $a = -4b$, and consequently $GN = -b = a/4$ (GN being the distance between the centre of gravity G and the neutral point N). GN is therefore positive, and the vehicle will be oversteered, but not to a disadvantageous degree. The critical speed $V_{cr}$ is in fact given by the known relation $$V_{cr} = \sqrt{-1/K} = \sqrt{4.5\, a\, C/M}$$ in which $M$ is the weight of the vehicle and $C$ the drift rigidity of one single wheel.

For a vehicle according to the invention, assuming, by way of example, the following data:

$M = 100$ Kg m /S$^2$
$a = 2.5$ m
$C = 400$ Kg/rad, the critical speed $V_{cr}$ will be about 76 Km/hour, a speed sufficiently high for one to be able to establish the skidding of the wheels through excessive power.

With the disposition according to the invention, in which the rear wheel $R_4$ is without a brake and is not engine-driven, the speed of rotation of said rear wheel $R_4$ will be exactly proportional to the speed of travel of the vehicle.

According to a preferred feature of the invention the speed of rotation of the rear wheel $R_4$ is therefore used as a reference in controlling the braking of the remaining three wheels $R_1$, $R_2$ and $R_3$ so that the difference in the angular velocity of these wheels relative to that of the rear wheel $R_4$ shall not exceed the critical difference corresponding to the maximum value of the coefficient of frictional grip, this critical difference in angular velocity being typically of the order of 20 percent.

The motor vehicle according to the invention is thus particularly amenable to the provision of automatic braking control systems commonly known as "anti-skid" systems.

From the description given, and from the attached drawings, it is also evident that in a vehicle having a rhomboidal wheel disposition, assuming for the ratio $c/b$ the values specified, the resulting overall configuration of the wheelbase, apart from improving the stability of the vehicle, also allows the installation upon it of a body having good aerodynamic characteristics, with a nose PR of the elongated ogival type and a neutral axis LA arched upwards, a feature which noticeably improves the coefficient of aerodynamic penetration and at the same time allows the body to satisfy particular criteria of safety.

Moreover the passenger comfort of the vehicle according to the invention is particularly good, it being possible to place the rear seats SP in an area close to the centre of gravity G, thus ensuring particularly comfortable travel due to the considerable reduction in the pitching and rolling movements of the vehicle.

Naturally, details of practical embodiments of the invention may be widely varied with reference to what has been described and illustrated by way of non-restrictive example, without nevertheless going beyond the spirit and scope of the invention.

I claim:

1. A motor vehicle of the type having four road wheels arranged in a rhomboidal disposition comprising a steerable front wheel, two driven side wheels having a common axis and a rear wheel, said front and side wheels only having braking means associated therewith and said rear wheel being freely rotatable with its axis of rotation disposed parallel to the axis of said driven wheels at all times.

2. A motor vehicle as set forth in claim 1 wherein the ratio of the distance from the center of gravity of the vehicle to the axis of the rear wheel to the distance from the center of gravity of the vehicle to the common axis of said driven wheels is between 1.5 and 3 while the ratio of the distance from the front wheel axis to the common axis of the driven wheels to the distance between the axis of the front wheel and the center of gravity is between 1.225 and 1.66.

3. A motor vehicle as set forth in claim 2 wherein the distribution of the load upon the wheels is so chosen that, under standard conditions, about 10 percent of the load bears upon the rear wheel and about 25 percent of the load bears upon the front wheel and the remainder of the load bears upon the driven wheels.

4. A motor vehicle as set forth in claim 1 further including a motor propulsion system disposed between the axis of the driven wheels and the rear wheel, said system including an engine placed crossways in relation to the longitudinal axis of the motor vehicle.

* * * * *